United States Patent
Guo et al.

(10) Patent No.: US 7,697,844 B2
(45) Date of Patent: Apr. 13, 2010

(54) SYSTEM AND METHOD FOR ALLOCATING BANDWIDTH IN REMOTE EQUIPMENT ON A PASSIVE OPTICAL NETWORK

(75) Inventors: Yong Guo, Shanghai (CN); Ge Fan, Shanghai (CN); Ying Ren, Shanghai (CN); Yanjiao Hui, Shanghai (CN); Hui Yu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 647 days.

(21) Appl. No.: 11/609,976

(22) Filed: Dec. 13, 2006

(65) Prior Publication Data

US 2007/0212071 A1    Sep. 13, 2007

(30) Foreign Application Priority Data

Mar. 8, 2006    (CN) .......................... 2006 1 0058167

(51) Int. Cl.
*H04J 14/00* (2006.01)
(52) U.S. Cl. .............................. 398/69; 398/66; 398/68; 398/43; 370/395.41; 370/395.42; 370/395.43; 370/320; 717/117
(58) Field of Classification Search .................... 398/69, 398/68, 66, 43; 370/320, 395.42, 395.43, 370/395.41; 717/117
See application file for complete search history.

(56) References Cited

U.S. PATENT DOCUMENTS

| | | | | | |
|---|---|---|---|---|---|
| 5,463,620 | A | * | 10/1995 | Sriram | 370/412 |
| 6,088,734 | A | * | 7/2000 | Marin et al. | 709/232 |
| 6,501,762 | B1 | * | 12/2002 | Pillar et al. | 370/412 |
| 7,436,844 | B2 | * | 10/2008 | Wang et al. | 370/412 |
| 7,539,211 | B2 | * | 5/2009 | Oh et al. | 370/468 |
| 2004/0019876 | A1 | * | 1/2004 | Dravida et al. | 717/117 |
| 2005/0074238 | A1 | | 4/2005 | Sung et al. | |
| 2006/0013138 | A1 | * | 1/2006 | Haran et al. | 370/236 |
| 2006/0233197 | A1 | * | 10/2006 | Elmoalem et al. | 370/468 |
| 2006/0268704 | A1 | * | 11/2006 | Ansari et al. | 370/230 |

FOREIGN PATENT DOCUMENTS

CN        1592302         3/2005
WO   WO 2005039078 A1  *  4/2005

OTHER PUBLICATIONS

Assi, Chadi M., et al., "Dynamic Bandwidth Allocation for Quality-Of-Service Over Ethernet PONs," IEEE Journal on Selected Areas in Communications, vol. 21, No. 9, Nov. 2003, 11 pages.

(Continued)

*Primary Examiner*—Ken N Vanderpuye
*Assistant Examiner*—Amine Benlagsir
(74) *Attorney, Agent, or Firm*—Conley Rose, P.C.; Grant Rodolph

(57) ABSTRACT

The present disclosure provides a system and method for allocating bandwidth in remote equipment on a passive optical network (PON), wherein the system includes an optical line terminal (OLT), which monitors the acceptance of traffic requesting the PON remote equipment for service and configures through signaling control the parameters for the operation of classifying, shaping, and scheduling the traffic in the remote equipment, and a remote equipment which classifies, shapes, and schedules the accepted traffic based on the parameters configured by the OLT and allocates a proper bandwidth to the accepted traffic, and outputs the traffic in the scheduled order. The present disclosure helps ensure the bandwidth and delay requirements of individual traffic flows in the PON remote equipment are met and interaction between traffic of the same or different service class groups is eliminated.

20 Claims, 3 Drawing Sheets

OTHER PUBLICATIONS

Zou, Junni A., et al., "R+WFQ: A Novel SLA-Supported Packet Fair Queueing, Algorithm for OLT Scheduler," Proc. of SPIE, vol. 5262, No. 1, Feb. 8, 2005, pp. 602-608.

Foreign communication from a related counterpart application—European Search Report, 07001722.3-2416, Jun. 5, 2009, 9 pages.

* cited by examiner

SYSTEM AND METHOD FOR ALLOCATING BANDWIDTH IN REMOTE EQUIPMENT ON A PASSIVE OPTICAL NETWORK

CROSS-REFERENCE TO RELATED APPLICATIONS

This application is claiming priority of Chinese Application No. 200610058167.9 filed Mar. 8, 2006, entitled "A System and Method for Allocating Bandwidth in Remote Equipment on Passive Optical Network," which application is incorporated by reference herein in its entirety.

BACKGROUND

The present disclosure relates to the optical communication network field, and more particularly to a system and method for allocating bandwidth in remote equipment on a passive optical network (PON).

The conventional access network technologies are copper cable-based e.g. cable modem (CM) or asymmetric digital subscriber loop (ADSL) making it impossible to further improve the data rate. To accommodate future growth in users' multimedia and real-time services, fiber to the home (FTTH) is one of the solutions to this bandwidth bottleneck. As a fiber-based broadband access technology, PON is the most important approach to FTTH. A typical architecture of the PON is illustrated in FIG. 1.

Currently there are three types of PONs, e.g. asynchronous transfer mode (ATM)-based PON (APON) according to ITU-T recommendation G.983, Ethernet-based PON (EPON) according to IEEE standard 802.3ah, and Gigabit PON (GPON) according to ITU-T recommendation G.984. These three PON technologies are now the focus of the broadband optical access network technologies.

As is typical of the EPON architecture, one optical line terminal (OLT) is connected to a number of optical network units (ONUs) or optical network terminals (ONTs) via a shared optical fiber channel. EPON is available in various topologies, such as tree, ring, and bus topologies, of which the tree topology is used most commonly. To the extent no misunderstanding may be caused, the ONU and ONT are collectively called ONU hereafter.

In an EPON, the downstream transmission (OLT→ONU) is made by point-to-multipoint broadcast using a separate wavelength. Traffic going upstream (ONU→OLT) is routed in a multipoint-to-point manner and adopts time division multiple access (TDMA) technology so that each ONU takes a separate communication timeslot to avoid any conflicts. All of the ONUs involved in the transmission form a transmission cycle that generally has a fixed length.

Though there are international standards and products for the three PON technologies, they are defective in that the encapsulation efficiency of IP packets at the data link layer and the quality of service (QoS) are low, and label forwarding is not supported.

A new PON technology is disclosed in *Method for Operating and Managing a Passive Optical Network* (Chinese Patent No. 1592302), wherein the generalized multi-protocol label switching (GMPLS) technology is introduced into the PON to improve communication efficiency, QoS, and packet forwarding speed. Furthermore, its introduction of the connection-oriented characteristic (label switching path) makes it possible to use the integrated service (IntServ) model in the PON. The role of the IntServ model is to establish a connection in the network for each traffic and to reserve some resources for absolute QoS assurance. This model cannot be used in a core network where traffic is heavy, but is only applicable to a smaller network, such as access network.

One of the existing methods for bandwidth allocation in the PON is adopting the differentiated service (DiffServ) model as the service model in an EPON. The DiffServ model reduces its requirement on network equipment processing capability and thereby improves the network data transmission rate by grouping the traffic into a limited number of priority classes. This model is suitable for a core network. However, the DiffServ can only provide a differentiated service model on a large scale and cannot ensure the QoS of each traffic flow. In the existing EPON technology, traffic is first pooled within ONUs based on the service class and is then placed into different queues for transmission. The OLT assigns a transmit timeslot to each ONU according to the queuing state reported by each ONU. When the transmit timeslot arrives, the queue scheduling mechanism within the ONU will assign a bandwidth to each service class. The scheduling mechanism typically comprises a priority scheduler and a generalized processor sharing-based scheduler.

The defect of this PON bandwidth allocation method is that the bandwidth is scheduled within the ONU based on the service class. Though it is easy to implement, it can only ensure relatively fair access between different service classes and cannot guarantee fair access among different traffic flows. Because the PON access network directly faces the subscribers, who have various complex applications that compete for limited bandwidth, these applications have varied flow characteristics and QoS requirements. In some cases, some application data flows may preemptively seize the bandwidth by increasing the amount of data transmission while other normal data flows are unable to get services. In other cases, some applications have so many data flows that they may cause network congestion, leading to insufficient services for all flows despite the fact that the network can fully meet the service requirements of some of these flows. The method is incapable of flow control and access permission control and may cause a service QoS problem when the load on the network is heavy.

Another PON bandwidth allocation method is adopting ATM as the data carrier protocol in an APON. The ATM technology allows a separate connection to be established between the OLT and ONU for each flow as well as reservation of resources. The technology separates and aggregates the traffic flows via virtual path/virtual channel (VP/VC). The ATM technology provides a good solution to flow control, QoS assurance, security, and improvement of switching speed and billing in an access network. However, its internet protocol (IP) packet encapsulation efficiency may be too low and the protocol layer may be complex. In view of the importance of IP as the future integrated multi-task platform, the ATM technology may no longer be a suitable carrier protocol for an IP-based optical access network. Therefore, the APON technology may be gradually declining.

Still another method for PON bandwidth allocation is the GPON encapsulation mode (GEM)-based GPON that adopts the framing method similar to general framing procedure (GFP). This method has the same characteristics as the ATM method in that both are optimized for time division multiplexed (TDM) services. As with the ATM-based solution, this PON bandwidth allocation method is inefficient in supporting IP and is relatively complicated to implement.

SUMMARY

The present disclosure aims to provide a device and method for allocating bandwidth in PON remote equipment so that the bandwidth and delay requirement of each flow in the PON remote equipment is met, and interaction between traffic of the same or different service groups is eliminated.

According to an embodiment, the present disclosure provides a system for allocating bandwidth in the PON remote equipment. The system used for allocating bandwidth to a plurality of remote equipment on a passive optical network (PON) and comprising:

an optical line terminal (OLT) that controls the acceptance of traffic requesting service by the PON remote equipment and, through signaling control, classifies, shapes, and schedules the traffic in the remote equipment; and wherein the remote equipment classifies, shapes, and schedules the received traffic based on the parameters configured by the OLT, allocates a bandwidth to the received traffic, and outputs the traffic in the scheduled order.

The present disclosure also provides a method for allocating bandwidth in passive optical network (PON) remote equipment, comprising:

configuring, within the PON remote equipment, the parameters for classifying, shaping and scheduling operations; and the PON remote equipment classifying, shaping, and scheduling the received traffic based on the configured parameters, allocating a corresponding bandwidth to the received traffic, and outputting the traffic in the scheduled order.

As we can see from the above technical solution, by adopting the IntServ model in the ONU to classify, shape, and schedule the accepted traffic, the present disclosure achieves the management particle size of a single flow, wherein the bandwidth and delay needs of each flow in the ONU is met, and interaction between flows of the same or different service groups is eliminated. It is an effective solution to the problem with the existing differentiated service model, e.g. there are different QoS for different service classes, but the QoS for a single flow within each service class is ignored. Since the number of traffic flows handled by an access network is not very big, the present disclosure delivers absolute QoS assurance for traffic in the ONU with a management complexity that is acceptable to the network.

DETAILED DESCRIPTION

The disclosure provides a system and method for allocating bandwidth in remote equipment on a PON. Specifically, the OLT controls the acceptance of traffic requesting the PON ONU for service, and the ONU classifies, shapes, and schedules the accepted traffic.

Figure 1:
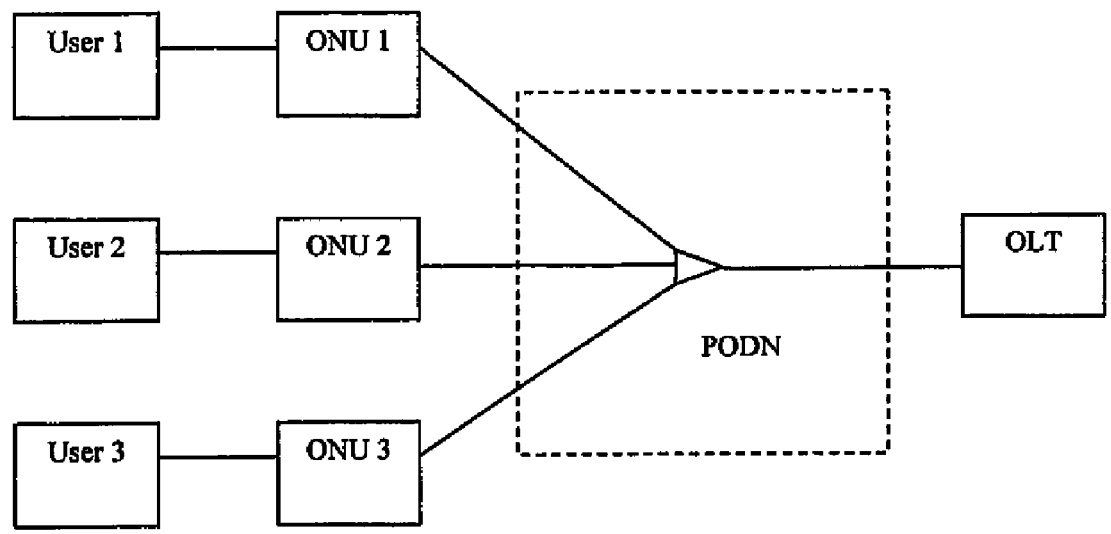
FIG. 1 is a schematic drawing illustrating one embodiment of a PON architecture.
Figure 2:
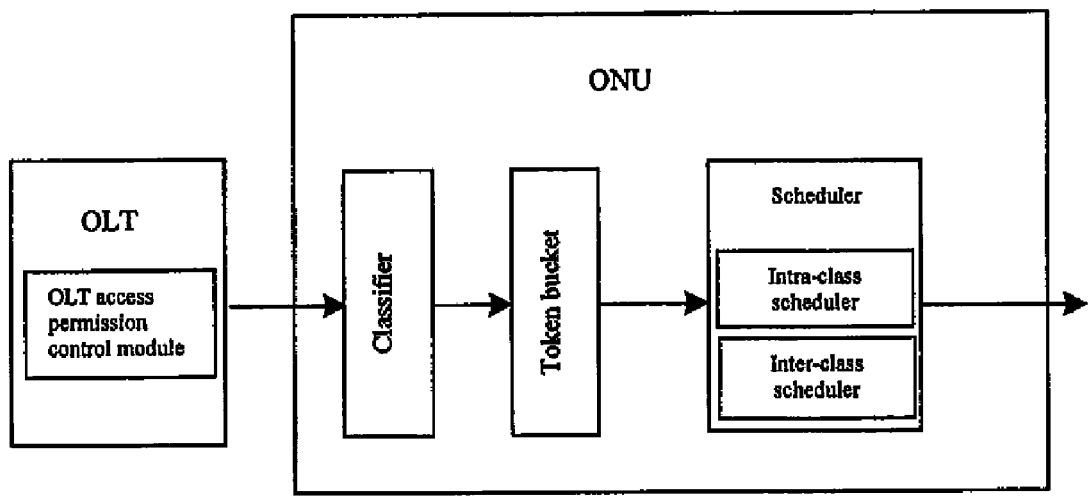
FIG. 2 is a schematic drawing illustrating the architecture of an embodiment of the system of the present disclosure.

The present disclosure is described in greater detail below in conjunction with the accompanying drawings. The PON remote equipment of the present disclosure includes an ONU or ONT. The architecture of the system of the present disclosure is shown in FIG. 2. Taking an ONU as an example, the system includes an OLT access permission control module built into the OLT and the ONU. The ONU of the present disclosure adopts the integrated service model and includes a classifier for checking and analyzing the group headers of the arriving traffic based on classification rules and separating the traffic. Wherein the classifier first groups the traffic accepted by the ONU into a corresponding service class to prioritize the traffic so that different traffic gets a different service. To support different services, the present disclosure defines three different service classes based on the IntServ model, and the three classes are guaranteed service, controlled-load service, and best effort service classes.

The guarantee service is to have guaranteed access to the bandwidth, delay restriction meeting the requirements of the traffic, and is the service of the highest priority. As the traffic in the guaranteed service class is sent first, the guaranteed service can be provided to voice and time-sensitive flows. The controlled-load service is the traffic that is serviced at a level similar to when there is not a network overload, even when there is a network overload. That is, the data packet delay and packet loss are low for the traffic of this class when there is network congestion. The controlled-load service is the service of the second highest priority. The best effort service is the service of the lowest priority, and the traffic in this class is sent last.

Once the grouped traffic is accepted by the ONU into the corresponding service groups, the classifier checks and analyzes the group headers of the traffic group in different service classes based on the source/destination address, source/destination port, the service class identifier code, and the protocol, and separates the traffic in each traffic group. A separate buffer queue is established in the ONU for each traffic in the guaranteed service class group and the controlled-load service class group to wait for service. All traffic in the best effort service class group is mixed and is buffered in a default queue to wait for service. The above classification rules are configured through the OLT access permission control module inside the OLT.

The ONU also includes a token bucket for shaping each buffered traffic in the guaranteed service class group and controlled-load service class group. The shaping operation is completed before queue scheduling. Once shaped by the token bucket ($\sigma_i$, $\rho_i$), there will be no burst in the data flow and the data are queued at a controlled rate. The token bucket restriction parameters, e.g. mean rate, $\rho$, and depth, $\sigma$, are configured through the OLT access permission control module built into the OLT. The mean rate of the token bucket can be the mean rate of the traffic to be shaped and the depth of the token bucket can be the maximum packet length of the traffic to be shaped.

The ONU also includes a scheduler, which includes an intra-class scheduler and an inter-class scheduler. The intra-class scheduler schedules traffic queues in the guaranteed service class group and the controlled-load service class group. The WFQ (weighted fair queuing) algorithm is used to schedule between traffic queues in the same guaranteed service class group or controlled-load service class group, wherein each traffic queue is assigned a corresponding weight configured by the OLT based on the characteristics of the traffic. The scheduled traffic in the guaranteed service class group is sent to the first transmit priority queue, while the scheduled traffic in the controlled-load service class group is sent to the second transmit priority queue. All traffic flows in the best effort service class group are mixed in the first-in-first-out scheduler without intra-class scheduling by the intra-class scheduler, and are sent directly to the default transmit queue or the third transmit priority queue.

When the ONU's transmit timeslot arrives, the inter-class scheduler schedules between these transmit priority queues using the absolute priority-based scheduling scheme. That is, the guaranteed service data flows in the first transmit priority queue are first sent until the queue is emptied, and then the controlled-load service data flows in the second transmit priority queue are sent, and the best effort service data flows in the default transmit queue or the third transmit priority queue are sent last.

The system also includes an OLT access permission control module, which limits the amount of traffic, N, accepted by and throughput, Y, of the ONU, and configures, through signaling control, various parameters including classification rules used by the classifier in the ONU, token bucket restriction parameters, queuing weights used by the weighted fair queuing scheduler, and buffer size.

Figure 3:
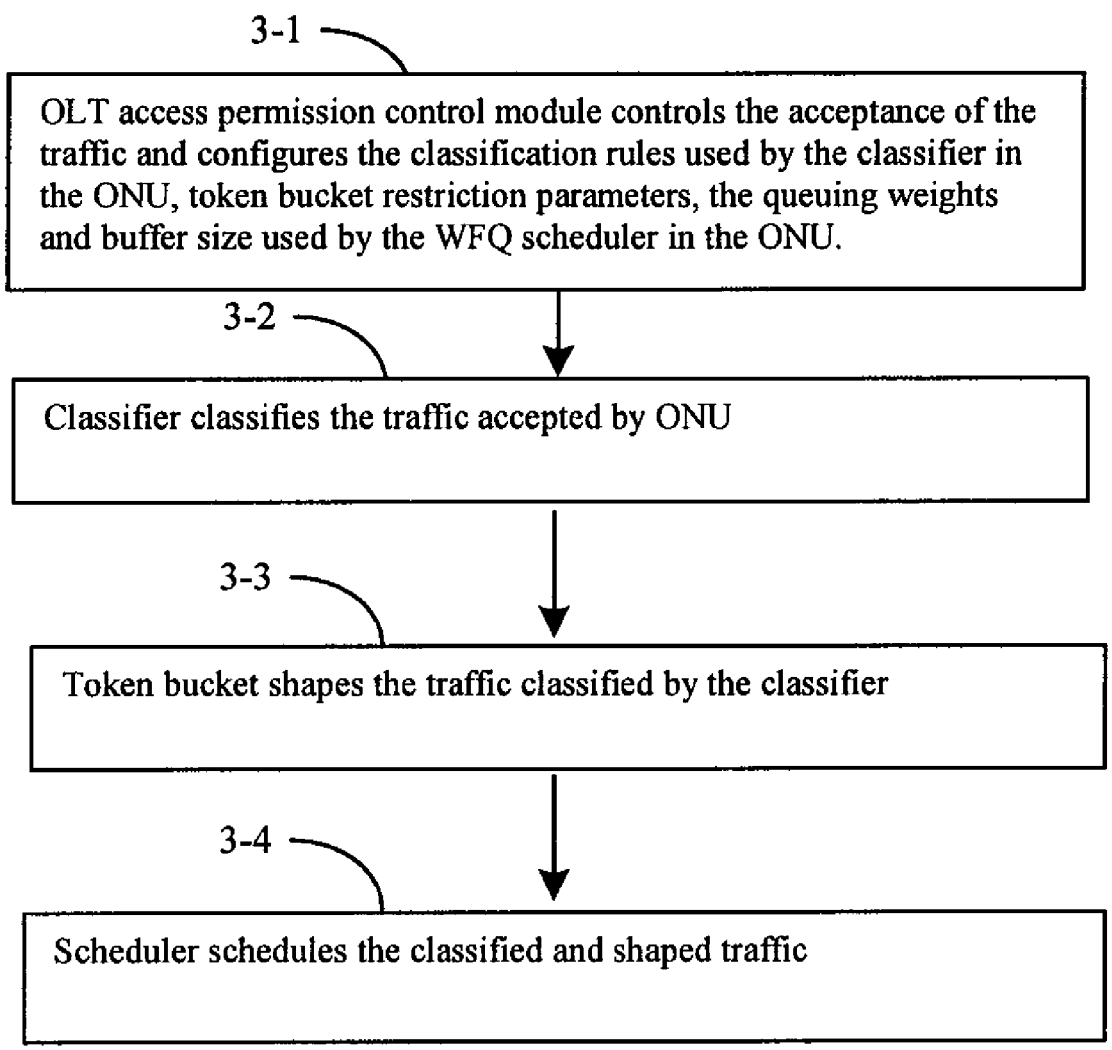
FIG. 3 is a flow chart depicting an embodiment of the method of the present disclosure.

The method of the present disclosure is implemented in the flow shown in FIG. 3 and includes the following steps:

Step 3-1: The OLT access permission control module controls the acceptance of the traffic and configures the classification rules used by the classifier in the ONU, the token bucket restriction parameters, the queuing weights, and the buffer size used by the WFQ scheduler in the ONU.

The OLT access permission control module checks the bandwidth usage state of the ONU on a real-time basis. When new user service traffic requests the ONU for service, the ONU reports the needed bandwidth, b, delay, d*, requirement, and other service traffic characteristics through signaling to the OLT access permission control module. The OLT access permission control module determines whether the bandwidth currently available in the ONU can meet the bandwidth need of the traffic, and if yes, determines that the ONU accepts the traffic and calculates the guaranteed bandwidth, $g_i$, and weight coefficient, $\phi_i$, for the accepted traffic using access permission control algorithm. Otherwise, the OLT access permission control module determines that the ONU rejects the traffic. Alternatively, the OLT access permission control module proposes a parameter negotiation with the user of the traffic through signaling and determines that the ONU accepts the traffic if the bandwidth available in the ONU can meet the bandwidth requirement of the traffic after the negotiation.

In conclusion, the OLT access permission control module can limit the amount of traffic accepted by and throughput of the ONU. The access permission control algorithm also provides through signaling control information about the configuration of various parameters, including the classification rules used by the classifier in the ONU, the token bucket restriction parameters, the service rate of the weighted queuing scheduler, and the weight coefficient assigned to each traffic flow.

Step 3-2: The traffic accepted by the ONU is classified by the classifier.

The classifier first classifies the traffic accepted by the ONU according to the configured classification rules, wherein the classifier first groups the accepted traffic into the guaranteed service class group, the controlled-load service class group, and the best effort service class group.

Then, the classifier checks and analyzes the group headers of the guaranteed service class group, the controlled-load service class group, and the best effort service class group using the configured classification rules, the source/destination address, the source/destination port, the service class identifier code, and the protocol. A separate buffer queue is established in the ONU for each traffic in the guaranteed service class group and controlled-load service class group to wait for service. All traffic in the best effort service class group is mixed and buffered in a default queue to wait for service.

Step 3-3: The token bucket shapes the traffic classified by the classifier.

Once classified by the classifier, the traffic is shaped by the token bucket according to the configured token bucket restriction parameters. The token bucket shapes the individual traffic in the guaranteed service class group and controlled-load service class group according to the token bucket parameters $(\sigma_i, \rho_i)$, where the token bucket parameters $\sigma_i, \rho_i$ are negotiated between the user and the OLT access permission control module through signaling. The mean rate of the token bucket, $\rho$, may use the mean rate of the traffic, and the bucket depth may use the maximum packet length, $L_{max}$, of the traffic. Once the parameters are negotiated, the user must send the traffic in accordance with the negotiated parameters. If the user does not send the data flows according to the negotiated parameters, the token bucket has the ability to limit the service data flows so that they are in compliance with the agreed flow parameters.

For example, when the data packets of arriving traffic are greater than the above token bucket depth, the traffic is not in compliance with the network resource reserving protocol, and the data packets of the traffic will be discarded. When there is a burst in the traffic, the above mean rate of the token bucket can limit the data packet outflow rate.

To sum up, shaping with the token bucket can suppress any traffic bursts and control the rate at which the traffic flows into the network.

Step 3-4: The scheduler schedules the classified and shaped traffic.

In the present disclosure, the queuing scheduler in the ONU adopts a two-level buffer and queuing scheduling mechanism. The first level scheduling is the intra-class scheduling, which is used only for traffic in the guaranteed service class group and the controlled-load service class group. The second level scheduling is the inter-class scheduling, which is used among the three service classes, e.g. guaranteed service, controlled-load service, and best effort service classes.

The classified and shaped traffic queues, which fall in the guaranteed service class group and the controlled-load service class group, are scheduled using the intra-class weighted fair queuing (WFQ) scheduling scheme, wherein each queue has a corresponding weight that is calculated by the OLT access permission control module according to the bandwidth preserved for and delay requirement of the traffic, and configured in the scheduler through signaling. The value of the weight reflects the bandwidth available to the queue. By scheduling through the scheduler, it is ensured that each traffic is able to share the bandwidth in proportion to its weight and to get the service it deserves without being affected by other traffic, and hence the separation between traffic.

The above scheduling involves the following steps: The remote equipment groups the service data traffic in the queues and calculates the service start virtual time and service end virtual time of each data group according to the group length and weight of the queue. At the time of transmission, the queue having the smallest service end virtual time is selected from among the queues for transmission and the system virtual time is updated. Then the remote equipment recalculates the service start virtual time and service end virtual time of all traffic queues in the guaranteed service class group or controlled-load service class group and outputs the queue with the smallest recalculated service end virtual time. The remote equipment repeats the above steps until all queues are emptied.

Once out of queue, the traffic goes to the corresponding transmit priority buffer queue. That is, the WFQ scheduled traffic in the guaranteed service class group is sent to the first transmit priority buffer queue, and that in the controlled-load service class group is sent to the second transmit priority buffer queue. Therefore, the traffic in the best effort service class group is mixed in the first in first out (FIFO) scheduler without the WFQ scheduling and goes directly to the default transmit buffer queue, e.g. the third transmit priority buffer queue.

In the ONU transmit timeslot, the absolute priority-based scheduling scheme is adopted to schedule between the three transmit priority queues, e.g. the traffic of the guaranteed service class group in the first transmit priority queue is sent first. When the first transmit priority queue is emptied, the traffic of the controlled-load service class group in the second transmit priority queue is sent. When the second transmit priority queue is emptied, the traffic of the best effort service class group in the third transmit priority queue is sent.

Figure 4:
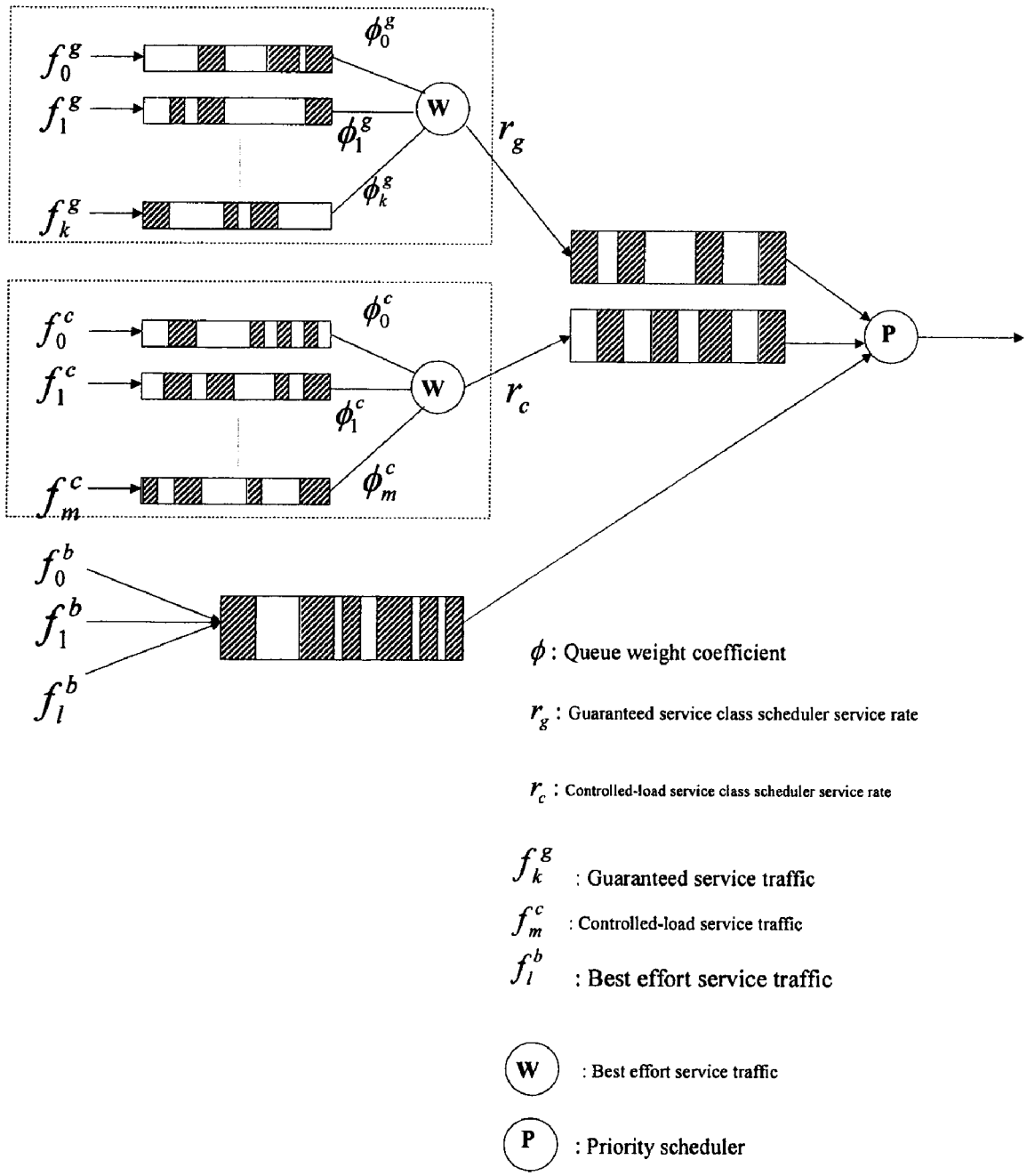
FIG. 4 is a schematic drawing illustrating the scheduling and buffer queuing within the scheduler of the present disclosure.

In the above embodiment of the method of the present disclosure, the internal queue scheduling and buffering by the scheduler is illustrated in FIG. 4.

The following further describes how the traffic in each service class group is handled. For the traffic of the guaranteed service class group, an absolute delay upper limit, d*, is needed. In an access network, there are propagation delays, transfer delays, queuing delays, and latency delays caused by use of time division multiple access for upstream transfer. The propagation delay is associated with the link service rate. Though it is inevitable, it is negligible compared with the other three delays as the link rate is usually high. The transfer delay is associated with the link length and link rate. Once the network architecture is set, the transfer delay is relatively stable and is inevitable as well. For the queuing delay, the shorter the queue, the smaller the delay. In the two-level queue scheduling scheme, the major function of the intra-class traffic scheduling is to eliminate interaction between traffic. As long as each queue gets a service rate greater than the arrival rate of the data packets, the queue will receive timely service, and the queuing delay will be very small. In the present disclosure, the intra-class scheduling rate is determined by the reserved bandwidth calculated by the OLT access permission control module. The reserved bandwidth is $$r = \sum_{i=1}^{N} b_i$$

and the WFQ scheduler assigns a weight coefficient of $\phi_i$ to the traffic that is in compliance with the token bucket parameters. Based on the weight coefficient and the service rate of the scheduler, each access traffic, $f_i$, may be provided with a minimum service rate of $$g_i = r\phi_i \bigg/ \sum_{j=1}^{N} \phi_j.$$

When the intra-class scheduled data traffic group goes into the first transmit priority queue for transmission, the traffic of the guaranteed service class group will be sent first upon arrival of the ONU transmit timeslot until the queue is emptied. Accordingly, the maximum delay at the first level scheduling can be obtained, e.g. $d_i^* \leq \sigma_i/g_i + L_{max}/r$ where $\sigma_i$ is the token bucket depth and $L_{max}$ is the maximum packet length of the traffic.

The traffic of the controlled-load service class group does not have a stringent requirement for delay boundary. As long as the traffic has access to certain service bandwidth under any circumstances, the QoS will not be significantly impacted by network congestion. The system reserves certain bandwidth for each traffic in the controlled-load service class group based on the negotiation between the user and network. In the first level weighted fair scheduling, the service rate equals to the sum of the bandwidth reserved for all traffic, e.g.

$$r = \sum_{i=1}^{N} b_i$$

and each single queue has the reserved bandwidth according to its weight. When the ONU transmit timeslot arrives, sending of service data flows in the controlled-load service class group starts after all service data flows in the guaranteed service class group are sent. The transmit timeslot that the ONU gets depends on the bandwidth reserved for the guaranteed service and the controlled-load service. As long as there is no data burst, this can ensure that the bandwidth requirement required by the traffic in guaranteed service class and the controlled-load service class can be fully met. In the event of a data burst, the bandwidth for the best effort service traffic can be taken to ensure the QoS for the traffic in the guaranteed service class and controlled-load service class.

The traffic in the best effort service class group does not have delay requirement, and it is not necessary to ensure the QoS for a single flow of this kind of traffic. Therefore, the token bucket and the first level scheduling are not needed here. What is required to ensure normal service of this kind of traffic is to define a minimum service bandwidth. When the bandwidth of best effort service in an ONU transmit timeslot is taken, the system will do its best to make it up in the next ONU transmit timeslot so that this kind of data are sent properly. When the system is unable to meet the requirement of this kind of service or there are too many service data packets in the default queue, the system will discard the service data packets in the default queue to relieve network congestion.

It should be understood that the above are only exemplary and not limiting preferred embodiments of the present disclosure. Any alteration or substitutions that can be readily made by those skilled in the art without departing from the technical scope of the present disclosure should be encompassed within the scope thereof. Therefore, the disclosure is solely defined by the appended claims.

What is claimed is:

1. A telecommunications network component applied in a remote equipment, the remote equipment being coupled to an optical line terminal (OLT) in a passive optical network (PON), comprising:
a processor configured to implement a method comprising:
reporting a needed bandwidth and a delay requirement of a traffic through a first signaling from the remote equipment to the OLT;
configuring weight coefficients of at least one of a plurality of service classes in the remote equipment through a second signaling from the OLT in response to the reporting;
recognizing reception of a plurality of traffic having the plurality of service classes;
classifying each of the plurality of traffic into a corresponding service class within the plurality of service classes;

shaping the plurality of traffic in at least one service class using an intra-class scheduler based upon the weight coefficients; and facilitating output of the plurality of traffic using an inter-class scheduler amongst the plurality of service classes; and wherein the intra-class scheduler is adapted to configure the weight coefficients for each of a guaranteed service class and a controlled-load service class through a signaling from the OLT to the remote equipment if the OLT determines that a bandwidth available at the remote equipment can meet the bandwidth need of the traffic.

2. The component of claim 1, wherein classifying the traffic comprises placing the traffic in at least one service class into a corresponding queue, wherein shaping the traffic comprises shaping the traffic in the queue using a restriction parameter, wherein the method further comprises scheduling the traffic in the queue using a scheduling parameter, and wherein the traffic is output as scheduled.

3. The component of claim 1, wherein the plurality of service classes comprise: a guaranteed service class, a controlled-load service class, and a best effort service class.

4. The component of claim 3, wherein scheduling the traffic comprises:

scheduling the traffic in the guaranteed service class and the controlled-load service class using a weighted fair queuing algorithm based on the weight coefficients configured for the guaranteed service class queues and the controlled-load service class queues configured by the OLT;

placing up to all of the traffic in the guaranteed service class into a timeslot;

placing up to all of the traffic in the controlled-load service class into the timeslot when the traffic in the guaranteed service class does not fill the timeslot; and placing up to all of the traffic in the best effort service class into the timeslot when the traffic in the guaranteed service class and the controlled-load service class does not fill the timeslot.

5. The component of claim 1, wherein the component is part of an optical network terminal or an optical network unit.

6. A method for allocating bandwidth in a remote equipment in a passive optical network (PON), comprising:

reporting a needed bandwidth and a delay requirement of a traffic through a first signaling from the remote equipment to an optical line terminal (OLT) coupled to the remote equipment;

configuring a plurality of parameters for classifying, shaping, and scheduling a plurality of traffic having a plurality of service classes in a remote equipment through a second signaling from the OLT in response to the reporting, wherein the plurality of service classes comprise a guaranteed service class, a controlled-load service class, and a best effort service class, and wherein the plurality of parameters comprise weight coefficients for each of the guaranteed service class and the controlled-load service class;

classifying each of the plurality of traffic into a corresponding service class within the plurality of service classes using at least some of the parameters at the remote equipment;

scheduling the traffic within the guaranteed service class using an intra-class weighted fair queuing algorithm based on the weight coefficients for the guaranteed service class configured by the OLT at the remote equipment;

scheduling the traffic within the controlled-load service class using the intra-class weighted fair queuing algorithm based on the weight coefficients for the controlled-load service class configured by the OLT at the remote equipment; and scheduling the plurality of service classes using a priority-based schedule at the remote equipment.

7. The method of claim 6, wherein the parameters configured by the OLT comprise: a classification rule and token bucket restriction parameters.

8. The method of claim 7, wherein configuring the parameters comprises:

instructing the remote equipment negotiate a bandwidth needed by the traffic if the bandwidth available at the remote equipment can not meet the bandwidth need of the traffic; and instructing the remote equipment to accept the traffic if the bandwidth available at the remote equipment can meet the bandwidth need of the traffic after negotiating the bandwidth needed by the traffic.

9. The method of claim 6, wherein instructing the remote equipment to classify, shape, and schedule the traffic comprises causing the remote equipment to:

place the traffic in the guaranteed service class into a first queue, the traffic in the controlled-load service class into a second queue, and the traffic in the best effort service class into a third transmit priority queue; and shape the traffic in the guaranteed service class and the controlled-load service class using respective token bucket restriction parameters to the guaranteed service class and the controlled-load service class.

10. The method of claim 9, wherein at least one queue has a mean rate about equal to a mean rate for the traffic and a depth about equal to a maximum packet length for the traffic.

11. The method of claim 9, wherein the traffic in the guaranteed service class is placed from the first queue into a first transmit priority queue, the traffic in the controlled-load service class is placed from the second queue into a second transmit priority queue, and the traffic in the best effort service class is mixed and placed into the third transmit priority queue, and wherein the priority-based schedule fills a timeslot with up to all of the traffic in the first queue, then fills any remaining space in the timeslot with up to all of the traffic in the second queue, and then fills any remaining space in the timeslot with up to all of the traffic in the third queue.

12. The method of claim 11, wherein a service start virtual time and a service end virtual time for one of the guaranteed service class and the controlled-load service class are calculated, the queue with the smallest service end virtual time is output, and a system virtual time is updated, wherein the service start virtual time and the service end virtual time for one of the guaranteed service class and the controlled-load service class are recalculated, and the queue with the smallest recalculated service end virtual time is output, and wherein the recalculating and rescheduling are repeated until all queues are emptied.

13. The method of claim 7, wherein instructing the remote equipment to classify, shape, and schedule the traffic comprises causing the remote equipment to:

place the traffic in the guaranteed service class into a first queue, the traffic in the controlled-load service class into a second queue, and the traffic in the best effort service class into a third queue; and shape the traffic in the guaranteed service class and the controlled-load service class using respective token bucket restriction parameters to the guaranteed service class and the controlled-load service class configured by the OLT.

14. The method of claim 13, wherein at least one queue has a mean rate about equal to a mean rate for the traffic and a depth about equal to a maximum packet length for the traffic.

15. The method of claim 13, wherein the traffic in the guaranteed service class is placed from the first queue into a first transmit priority queue, the traffic in the controlled-load service class is placed from the second queue into a second transmit priority queue, and the traffic in the best effort service class is mixed and placed into the third transmit priority queue, and wherein the priority-based schedule fills a timeslot with up to all of the traffic in the first queue, then fills any remaining space in the timeslot with up to all of the traffic in the second queue, and then fills any remaining space in the timeslot with up to all of the traffic in the third queue.

16. The method of claim 15, wherein a service start virtual time and a service end virtual time for one of the guaranteed service class and the controlled-load service class are calculated, the queue with the smallest service end virtual time is output, and a system virtual time is updated, wherein the service start virtual time and the service end virtual time for one of the guaranteed service class and the controlled-load service class are recalculated, and the queue with the smallest recalculated service end virtual time is output, and wherein the recalculating and rescheduling are repeated until all queues are emptied.

17. The method of claim 6, wherein the remote equipment comprises an optical network terminal or an optical network unit.

18. An optical network unit (ONU), comprising:
 a classifier configured to classify a plurality of traffic having a plurality of service classes;
 a token bucket coupled to the classifier and configured to shape the classified traffic; and
 a scheduler coupled to the token bucket and configured to schedule the shaped traffic, the scheduler comprising an intra-class scheduler configured to schedule the traffic within at least one of a plurality of service classes; and an inter-class scheduler configured to schedule the traffic of all of the plurality of service classes;
 wherein the ONU further comprises means for reporting a needed bandwidth, a delay requirement of a traffic through a signaling from the ONU to an optical line terminal (OLT) coupled to the ONU;
 wherein the intra-class scheduler is adapted to configure weight coefficients to each of the guaranteed service class and the controlled-load service class through a signaling from the OLT to the ONU if the OLT determines that a bandwidth available at the remote equipment can meet the bandwidth need of the traffic;
 wherein the inter-class scheduler is configured to schedule the traffic of all of the plurality of service classes using a priority-based schedule;
 wherein the optical network unit outputs the scheduled traffic as scheduled by the scheduler.

19. The method of claim 6, wherein the weight coefficients are calculated by the OLT according to a bandwidth preserved for and a delay requirement of the traffic.

20. The optical network unit of claim 18, wherein the token bucket is configured with token bucket restriction parameters through a signaling from the OLT to the ONU.

* * * * *